United States Patent
Zhang et al.

(10) Patent No.: US 9,862,098 B2
(45) Date of Patent: Jan. 9, 2018

(54) METHODS AND DEVICES FOR CLEANING GARBAGE

(71) Applicant: Xiaomi Inc., Beijing (CN)

(72) Inventors: Pengfei Zhang, Beijing (CN); Yongfeng Xia, Beijing (CN); Yidong Wang, Beijing (CN); Tiejun Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 18 days.

(21) Appl. No.: 14/996,996

(22) Filed: Jan. 15, 2016

(65) Prior Publication Data
US 2016/0167233 A1 Jun. 16, 2016

Related U.S. Application Data

(63) Continuation of application No. PCT/CN2015/078068, filed on Apr. 30, 2015.

(30) Foreign Application Priority Data

Dec. 11, 2014 (CN) .......................... 2014 1 0764394

(51) Int. Cl.
*G06K 9/00* (2006.01)
*B25J 11/00* (2006.01)
(Continued)

(52) U.S. Cl.
CPC ........... *B25J 11/0085* (2013.01); *B25J 9/163* (2013.01); *B25J 9/1697* (2013.01);
(Continued)

(58) Field of Classification Search
CPC ...... B25J 11/0085; B25J 9/1697; B25J 9/163; H04W 4/025; G06K 9/00664; Y10S 901/01; Y10S 901/46
See application file for complete search history.

(56) References Cited

U.S. PATENT DOCUMENTS 9,457,463 B2 * 10/2016 Tadayon .................... B25J 5/02
9,606,543 B2 * 3/2017 Jeon ..................... G05D 1/0297
(Continued)

FOREIGN PATENT DOCUMENTS

CN 102283616 A 12/2011
CN 103565366 A 2/2014
(Continued)

OTHER PUBLICATIONS

International Search Report of PCT/CN2015/078068, mailed from the State Intellectual Property Office of China dated Sep. 2, 2015.
(Continued)

*Primary Examiner* — Ali Bayat
(74) *Attorney, Agent, or Firm* — Finnegan, Henderson, Farabow, Garrett & Dunner LLP

(57) ABSTRACT

A garbage-cleaning method for use in a monitoring apparatus is provided. The method includes: acquiring monitored data about a monitored area; detecting whether garbage is present in the monitored area according to the monitored data; if garbage is present in the monitored area, acquiring location information of the garbage in the monitored area; and sending the location information of the garbage to a garbage-cleaning robot configured to clean the garbage according to the location information.

18 Claims, 16 Drawing Sheets

(51) Int. Cl.
    *B25J 9/16* (2006.01)
    *H04W 4/02* (2009.01)
    *G05D 1/02* (2006.01)

(52) U.S. Cl.
    CPC ....... *G05D 1/0246* (2013.01); *G06K 9/00664* (2013.01); *H04W 4/025* (2013.01); *G05D 2201/0203* (2013.01); *Y10S 901/01* (2013.01)

(56) References Cited

U.S. PATENT DOCUMENTS

| | | |
|---|---|---|
| 2005/0192707 A1 | 9/2005 | Park et al. |
| 2011/0082668 A1* | 4/2011 | Escrig ................. G05D 1/0246 703/1 |
| 2014/0278252 A1 | 9/2014 | Wold et al. |
| 2014/0336863 A1 | 11/2014 | So et al. |
| 2015/0367513 A1* | 12/2015 | Gettings ................ G06Q 10/06 700/248 |
| 2016/0368135 A1* | 12/2016 | Tadayon ................... B25J 5/02 |

FOREIGN PATENT DOCUMENTS

| | | |
|---|---|---|
| EP | 2801313 A2 | 11/2014 |
| JP | 2007-111854 A | 5/2007 |
| KR | 20040003090 A | 1/2004 |
| KR | 10-1075340 B1 | 10/2011 |
| KR | 20130089554 A | 8/2013 |
| KR | 10-2014-0133369 | 11/2014 |
| RU | 58423 U1 | 11/2006 |
| RU | 2624737 C2 | 7/2017 |

OTHER PUBLICATIONS

English version of International Search Report of PCT/CN2015/078068, mailed from the State Intellectual Property Office of China dated Sep. 2, 2015.

Extended European Search Report of European Patent Application No. 15198274.1, from the European Patent Office, dated Jun. 14, 2016.

Office Action for Russian Application No. 2015124673/13(038487), dated Sep. 27, 2016.

* cited by examiner

METHODS AND DEVICES FOR CLEANING GARBAGE

CROSS-REFERENCE TO RELATED APPLICATIONS

This application is a continuation of International Application No. PCT/CN2015/078068, filed Apr. 30, 2015, which is based upon and claims priority to Chinese Patent Application No. CN201410764394.8, filed Dec. 11, 2014, the entire contents of all of which are incorporated herein by reference.

TECHNICAL FIELD

The present disclosure generally relates to the field of smart household appliances, and, more particularly, relates to methods and devices for cleaning garbage.

BACKGROUND

A garbage-cleaning robot is a household electric appliance having certain level of artificial intelligence to automatically clean, e.g., the floor in a room. Conventionally, the garbage-cleaning robot works by user appointment. That is, the user sets a designated cleaning time, usually a time when the user is not at home, for the garbage-cleaning robot to clean the floor. However, such user-appointed method has a low cleaning efficiency. For example, the garbage-cleaning robot may not timely respond to newly generated garbage. Moreover, the garbage-cleaning robot may have to travel the entire room to locate the garbage.

SUMMARY

According to a first aspect of the present disclosure, there is provided a garbage-cleaning method for use in a monitoring apparatus, comprising: acquiring monitored data about a monitored area; detecting whether garbage is present in the monitored area according to the monitored data; if garbage is present in the monitored area, acquiring location information of the garbage in the monitored area; and sending the location information of the garbage to a garbage-cleaning robot configured to clean the garbage according to the location information.

According to a second aspect of the present disclosure, there is provided a garbage-cleaning method for use in a garbage-cleaning robot, comprising: receiving location information of garbage sent by a monitoring apparatus; and cleaning the garbage according to the location information.

According to a third aspect of the present disclosure, there is provided a monitoring apparatus for cleaning garbage, comprising: a processor; and a memory for storing instructions executable by the processor; wherein the processor is configured to: acquire monitored data about a monitored area; detect whether garbage is present in the monitored area according to the monitored data; if garbage is present in the monitored area, acquire location information of the garbage in the monitored area; and send the location information of the garbage to a garbage-cleaning robot configured to clean the garbage according to the location information.

According to a fourth aspect of the present disclosure, there is provided a garbage-cleaning robot, comprising: a processor; and a memory for storing instructions executable by the processor; wherein the processor is configured to: receive location information of garbage sent by a monitoring apparatus; and clean the garbage according to the location information.

BRIEF DESCRIPTION OF THE DRAWINGS

The accompanying drawings, which are incorporated into and constitute a part of the specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the invention as recited in the appended claims.

Figure 1:
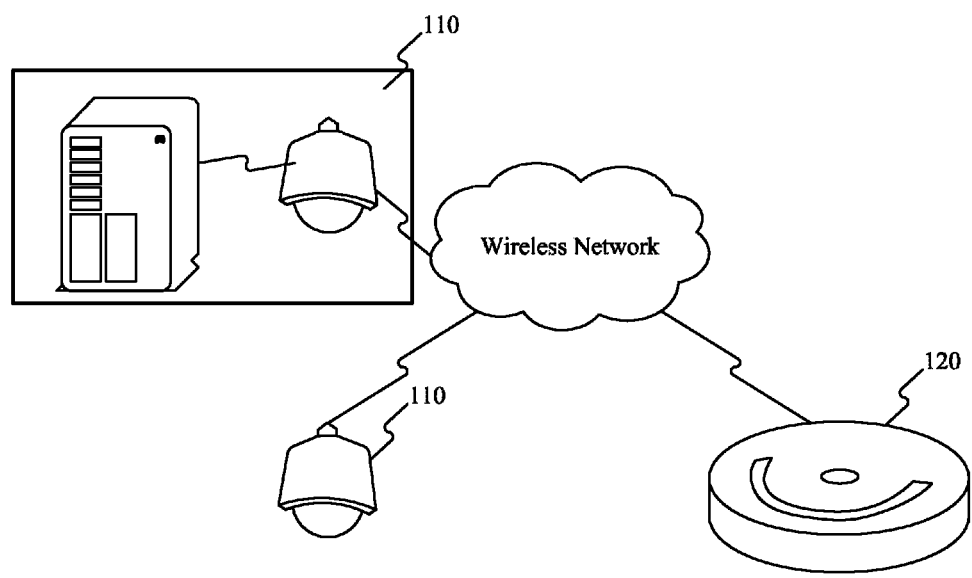
FIG. 1 is a schematic diagram illustrating an implementation environment of a method for cleaning garbage, according to an exemplary embodiment.

FIG. 1 is a schematic diagram illustrating an implementation environment 100 of a method for cleaning garbage, according to an exemplary embodiment. Referring to FIG. 1, the implementation environment 100 may include a monitoring apparatus 110, and a garbage-cleaning robot 120.

The monitoring apparatus 110 may be a monitoring camera having computing capabilities. Alternatively, the monitoring apparatus 110 may be a combination of a monitoring camera and an electronic device having computing capabilities, such as a smart phone, a tablet computer, a personal computer, a server, and the like.

The garbage-cleaning robot 120 may be a robot capable of cleaning garbage, such as a sweeping robot, a mopping robot, and the like.

The monitoring apparatus 110 may communicate with the garbage-cleaning robot 120 via wireless signals. The wireless signals may be Bluetooth signals, infrared signals, wireless fidelity (WiFi) signals, or acoustic signals.

Figure 2:
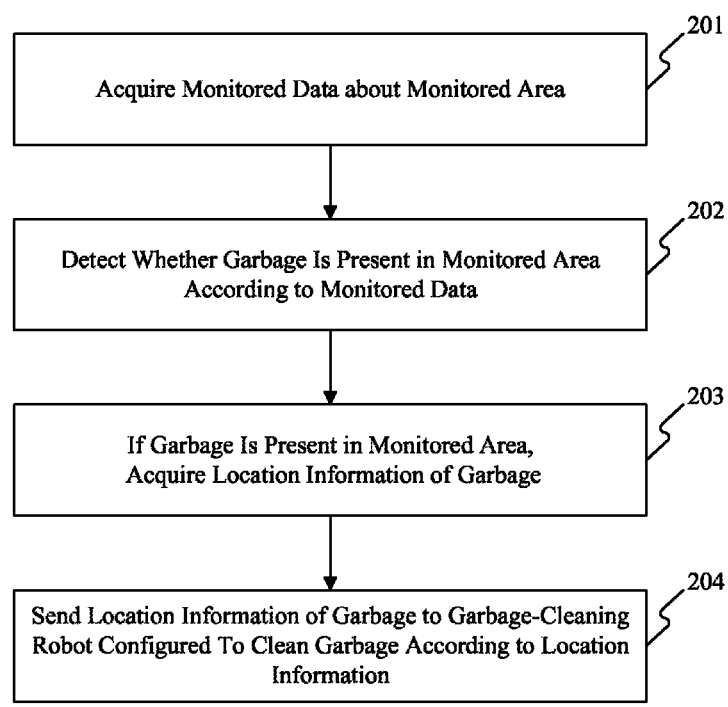
FIG. 2 is a flowchart of a method for cleaning garbage, according to an exemplary embodiment.

FIG. 2 is a flowchart of a method 200 for cleaning garbage, according to an exemplary embodiment. For example, the method 200 may be applied in the monitoring apparatus 110 (FIG. 1). Referring to FIG. 2, the method 200 may include the following steps.

In step 201, the monitoring apparatus acquires monitored data about a monitored area.

In step 202, the monitoring apparatus detects whether garbage is present in the monitored area according to the monitored data.

In step 203, if garbage is present in the monitored area, the monitoring apparatus acquires location information of the garbage in the monitored area.

In step 204, the monitoring apparatus sends the location information of the garbage to a garbage-cleaning robot, such that the garbage cleaning robot cleans the garbage according to the location information.

The method 200 makes the garbage-cleaning robot clean the garbage timely and precisely according to the location information of the garbage. Therefore, the method 200 improves the cleaning efficiency of the garbage-cleaning robot.

Figure 3:
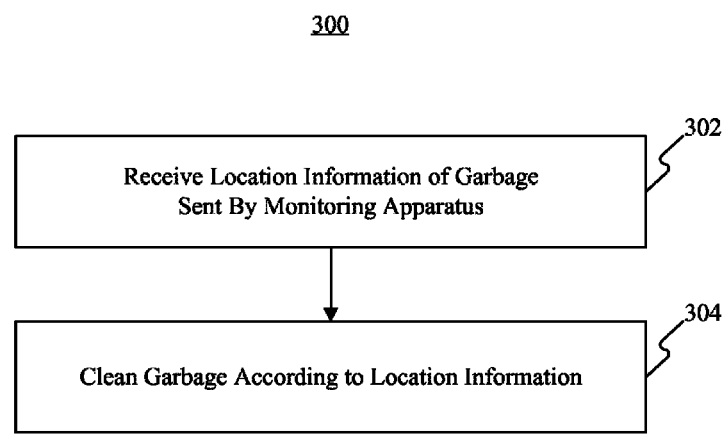
FIG. 3 is a flowchart of a method for cleaning garbage, according to an exemplary embodiment.

FIG. 3 is a flowchart illustrating a method 300 for cleaning garbage, according to an exemplary embodiment. For example, the method 300 may be applied in the garbage-cleaning robot 120 (FIG. 1). Referring to FIG. 300, the method 300 may include the following steps.

In step 302, the garbage-cleaning robot receives location information of the garbage sent by a monitoring apparatus.

In exemplary embodiments, the monitoring apparatus acquires monitored data about a monitored area, and detects whether garbage is present in the monitored area according to the monitored data. If garbage is present in the monitored area, the monitoring apparatus sends the location information of the garbage to the garbage-cleaning robot.

In step 304, the garbage-cleaning robot cleans the garbage according to the location information.

Figure 4A:
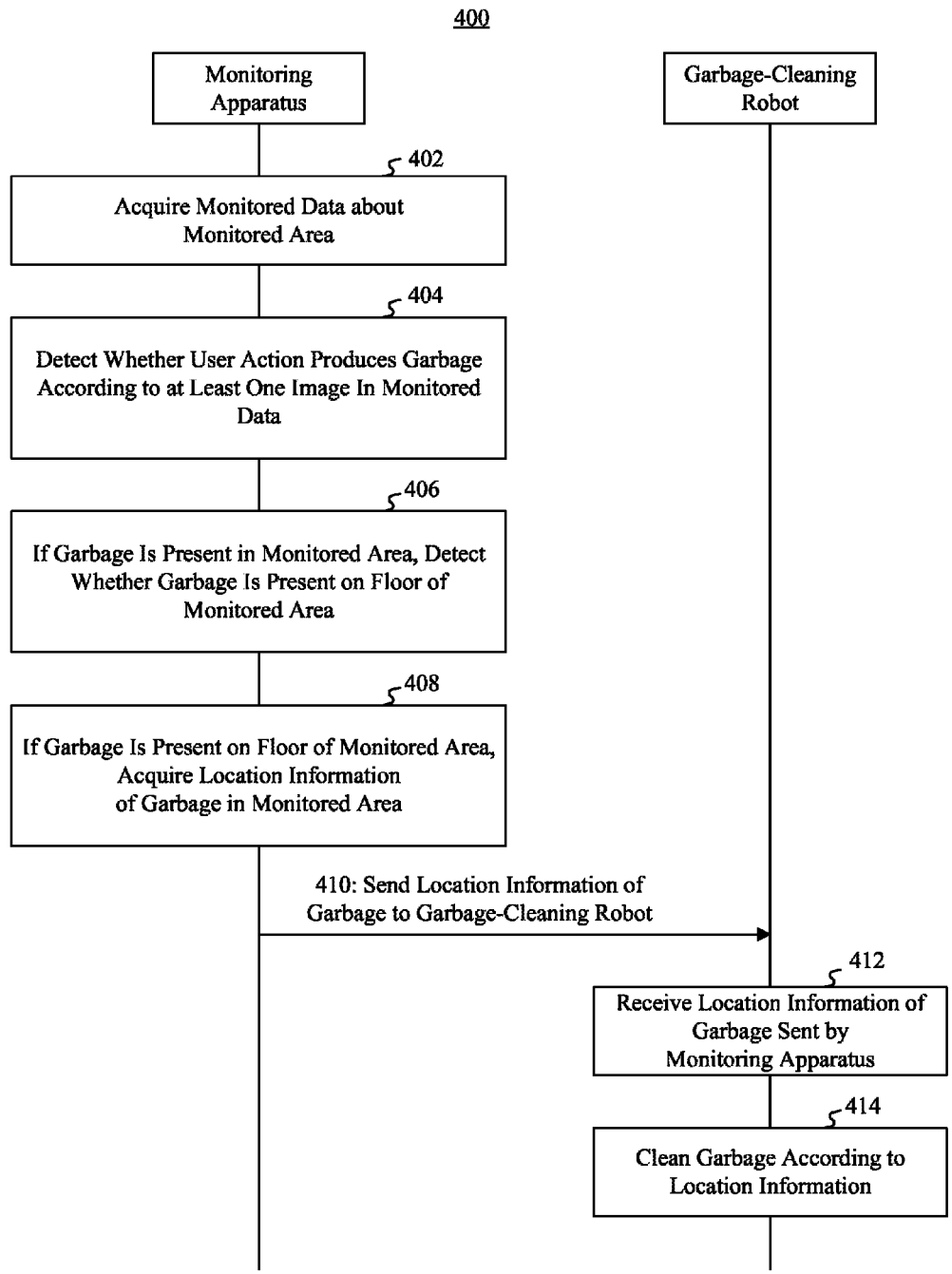
FIG. 4A is a flowchart of a method for cleaning garbage, according to an exemplary embodiment.

FIG. 4A is a flowchart of a method 400 for cleaning garbage, according to an exemplary embodiment. For example, the method 400 may be applied in the implementation environment 100 (FIG. 1). Referring to FIG. 4A, the method 400 may include the following steps.

In step 402, a monitoring apparatus acquires monitored data about a monitored area.

The monitored data may be image data or video data. The video data may include successive frames of images. If the monitoring apparatus is a monitoring camera having computing capabilities, the monitored data may be acquired by the monitoring camera directly. If the monitoring apparatus is a combination of a monitoring camera and an electronic device having computing capabilities, the monitored data may be acquired by the electronic device through the monitoring camera.

In step 404, the monitoring apparatus detects whether a user action produces garbage according to at least one image in the monitored data.

Because garbage is usually produced by an action of the user, the monitoring apparatus may start to detect the production of garbage after detecting the user action, according to at least one image. This way, the monitoring apparatus may reduce unnecessary workload and therefore improve working efficiency. For example, step 404 may further include the following sub-steps. First, the monitoring apparatus detects whether a user action is present in at least one acquired image. Such image may be a frame within the video data, or an image within the image data collected at a predetermined time interval, e.g., one image taken every second. Second, if an acquired image includes a user action, the monitoring apparatus detects whether the image also includes a moving object associated with the user action. Third, if the image includes a moving object, the monitoring apparatus detects whether the moving object is garbage according to a preset garbage-feature library.

Figure 4B:
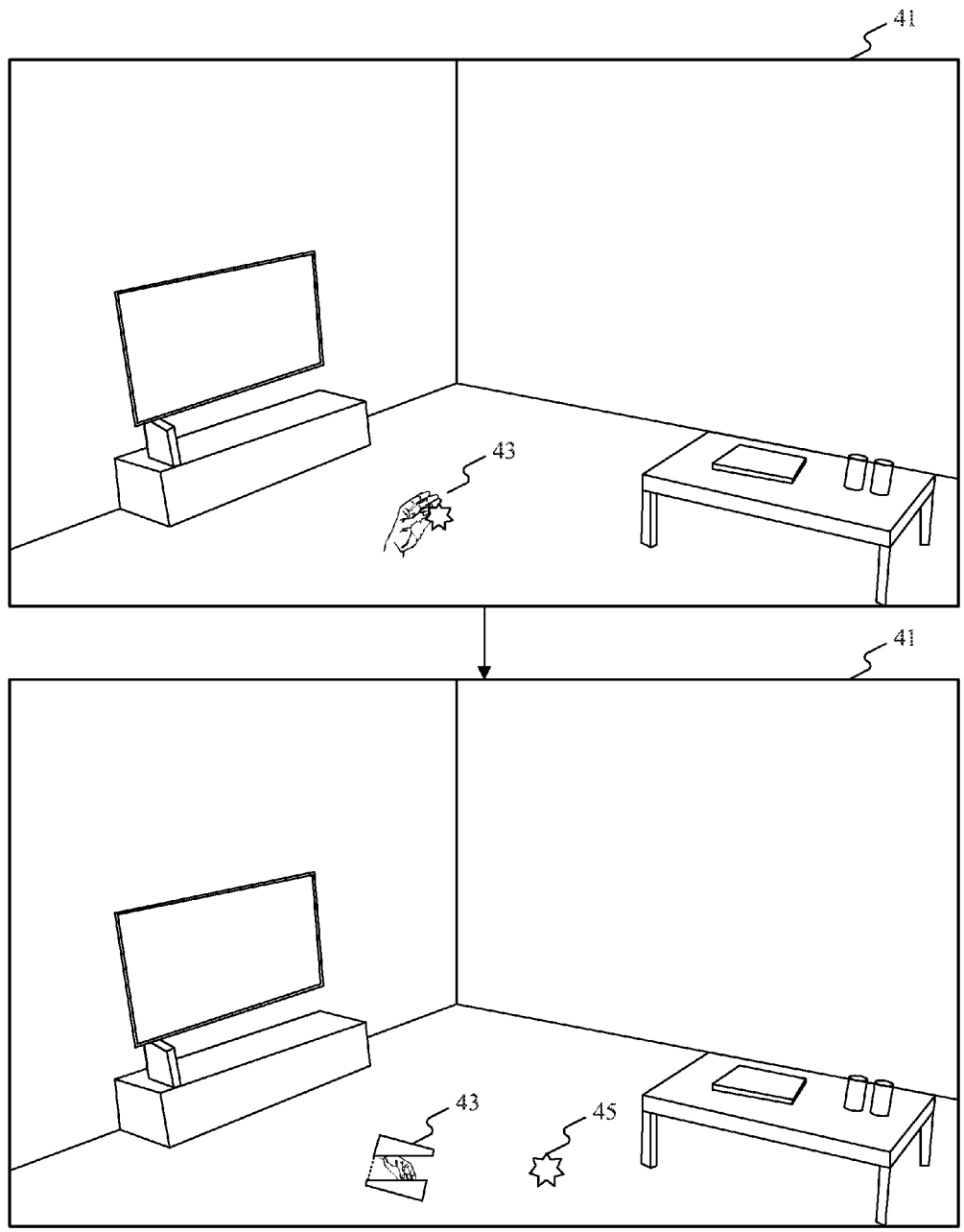
FIG. 4B is a schematic diagram illustrating an example of implementing a method for cleaning garbage, according to an exemplary embodiment.

For example, as illustrated in FIG. 4B, the monitoring apparatus may detect in an image 41 that a user makes a hand-waving action 43. The monitoring apparatus may further detects that the image 41 includes a moving object 45 associated with the hand-waving action 43. Subsequently, the monitoring apparatus detects that the moving object 45 is a waste paper according to the preset garbage-feature library. Accordingly, the monitoring apparatus may determine that garbage is present in the monitored area.

In step 406, if garbage is present in the monitored area, the monitoring apparatus detects whether the garbage is on a floor of the monitored area.

Figure 4C:
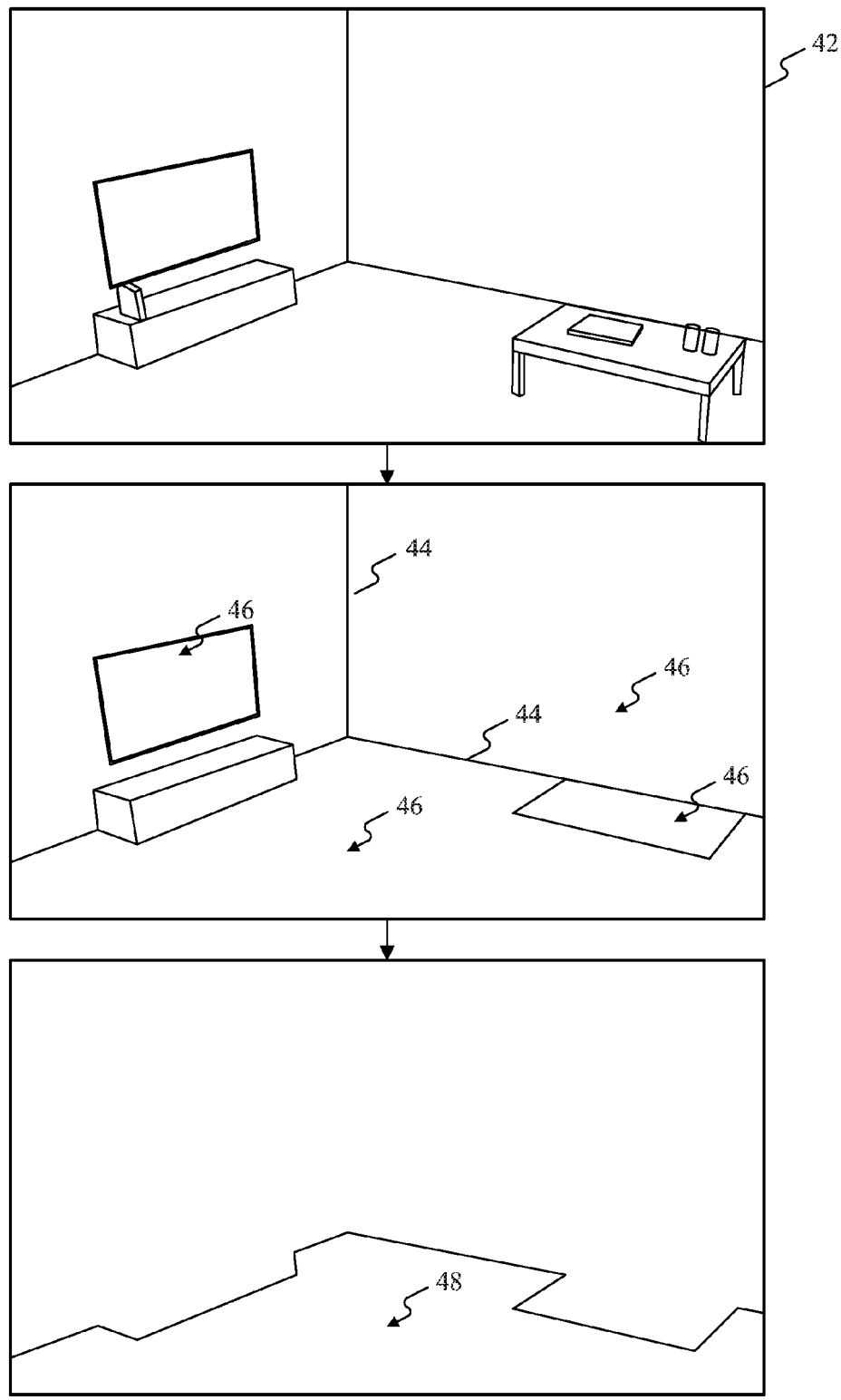
FIG. 4C is a schematic diagram illustrating an example of implementing a method for cleaning garbage, according to an exemplary embodiment.

For example, as illustrated in FIG. 4C, the monitoring apparatus may collect in advance an image 42 in which no moving object is present. The monitoring apparatus may then identify various edge lines 44 in the image 42 through an edge-detecting algorithm, and partitions the image 42 into one or more sub-areas 46 according to the various edge lines 44. Subsequently, the monitoring apparatus identifies a floor 48 among the one or more sub-areas 46 according to a preset ground-feature library or through the user's manual operations. Finally, the monitoring apparatus detects whether garbage is present in the floor 48.

Figure 4D:
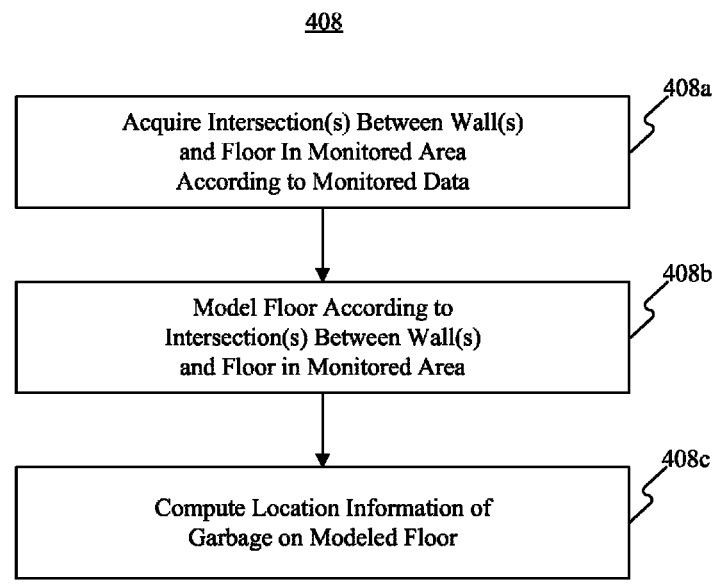
FIG. 4D is a flowchart of a method for cleaning garbage, according to an exemplary embodiment.

In step 408, if garbage is present on the floor of the monitored area, the monitoring apparatus acquires location information of the garbage in the monitored area. In some exemplary embodiments, step 408 may further include the following sub-steps as shown in FIG. 4D.

In sub-step 408a, the monitoring apparatus acquires one or more intersections between walls and the floor in the monitored area according to the monitored data. The monitoring apparatus also acquires one or more intersections between different walls in the monitored area according to the monitored data. The monitoring apparatus may acquire these intersections through the edge-detecting algorithm.

In sub-step 408b, the monitoring apparatus models the floor according to the intersections between the walls and the floor and between different walls. The angles formed by the intersections are usually right angles. The monitoring apparatus may model the floor in the monitored area according to the angles and the perspective principle. When a preset object library includes real dimensions of still objects in the monitored area, such as furniture and household appliances, the monitoring apparatus may compute real dimensions of the floor according to real dimensions of the still objects and the corresponding dimensions in the image.

In exemplary embodiments, the monitoring apparatus may perform sub-steps 408a and 408b at flexible timings. For example, the monitoring apparatus may perform sub-steps 408a and 408b during an idle time or when the monitoring apparatus is initially set up.

In sub-step 408c, the monitoring apparatus computes the location information of the garbage on the modeled floor. Such computation based on the modeling may reach a high level of precision.

In step 410, the monitoring apparatus sends the location information of the garbage to the garbage-cleaning robot.

The monitoring apparatus may send the location information of the garbage to the garbage-cleaning robot immediately after computing the location information. Alternatively, the monitoring apparatus may send the location information to the garbage-cleaning robot when the monitoring apparatus fails to detect moving objects in the monitored area for a certain time, indicating that the user may have left the monitored area. Cleaning the garbage after the user leaves may not affect the user.

In step 412, the garbage-cleaning robot receives the location information of garbage sent by the monitoring apparatus.

In step 414, the garbage-cleaning robot cleans the garbage according to the location information of the garbage. The garbage-cleaning robot may move to a part of the floor corresponding to the location information, and cleans the garbage.

Figure 5A:
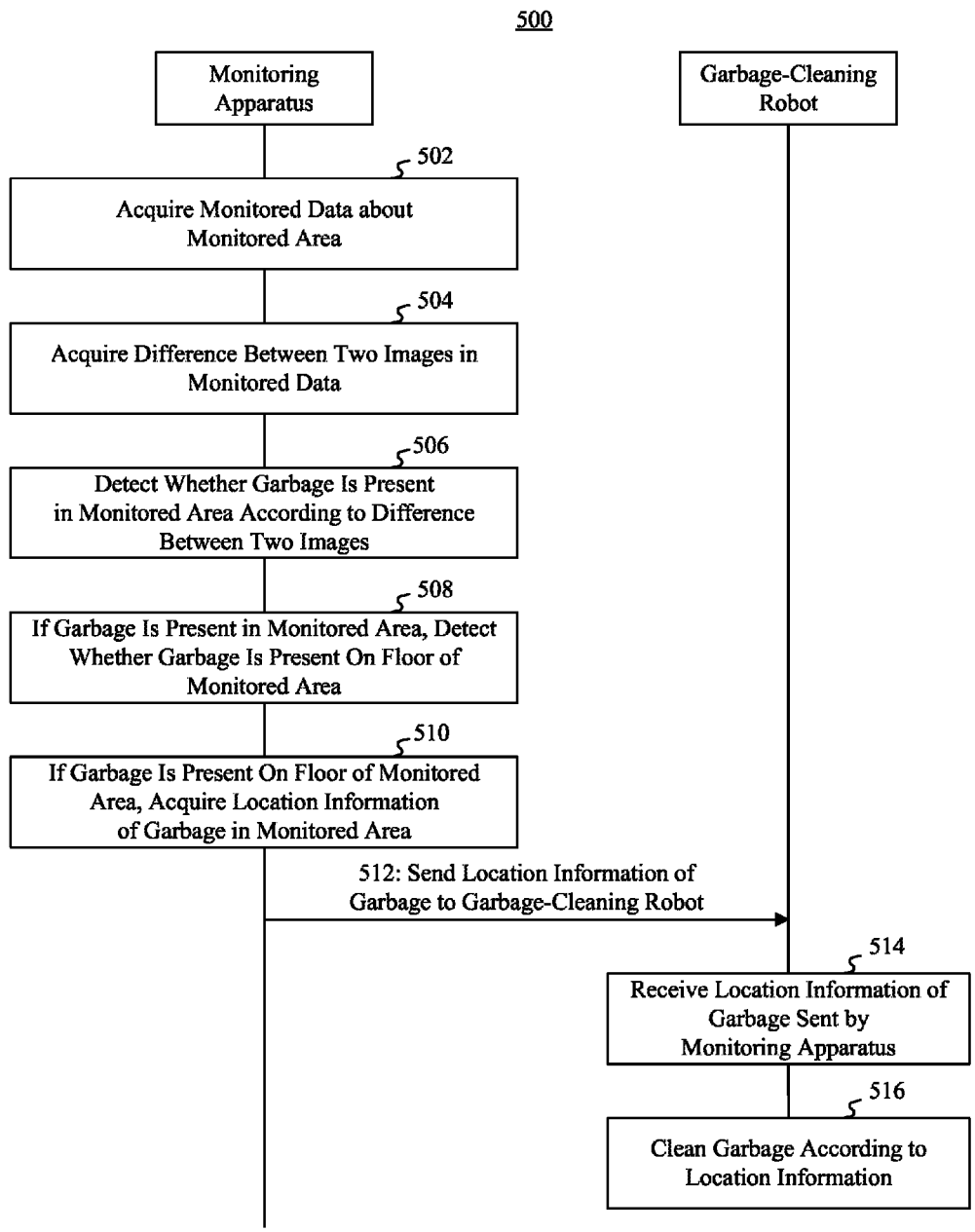
FIG. 5A is a flowchart of a method for cleaning garbage, according to an exemplary embodiment.

FIG. 5A is a flowchart of a method 500 for cleaning garbage, according to an exemplary embodiment. For example, the method 500 may be applied in the implementation environment 100 (FIG. 1). Referring to FIG. 5A, the method 500 may include the following steps.

In step 502, a monitoring apparatus acquires monitored data of a monitored area. For example, the implementation of step 502 may be similar to step 402 in the method 400 (FIG. 4A).

In step 504, the monitoring apparatus acquires a difference between two images in the monitored data.

During the implementation of step 504, the monitoring apparatus may extract two images from the monitored data. Among the two images, a first image may be a background image with no moving object, and a second image may be a more recent image in the monitored data. The monitoring apparatus may acquire the background image when the garbage-cleaning robot finishes a cleaning of the monitored area and the user is not in the monitored area. The monitoring apparatus may compare the two images to detect the difference between the two images.

Figure 5B:
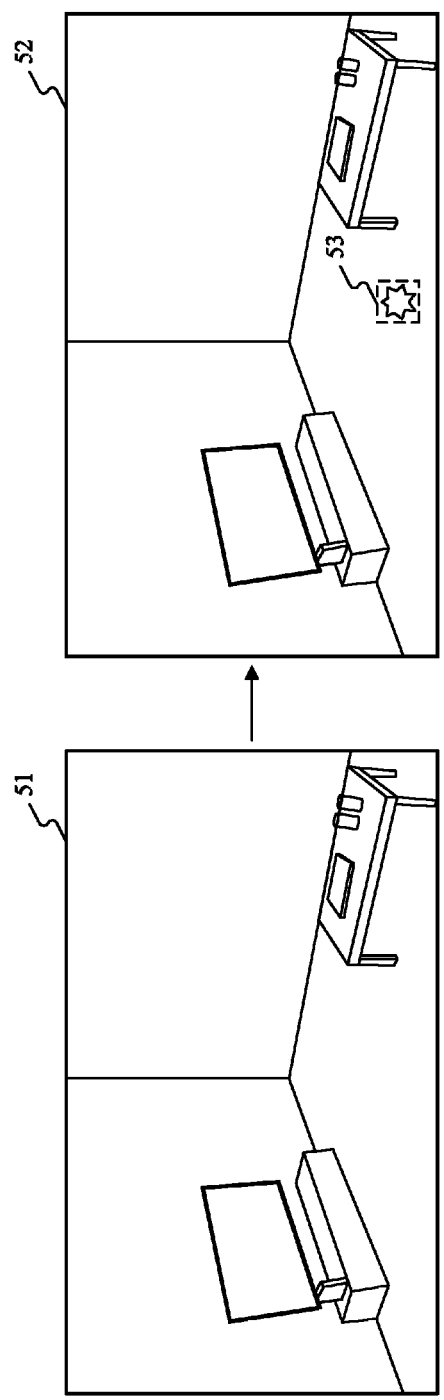
FIG. 5B is a schematic diagram illustrating an example of implementing a method for cleaning garbage, according to an exemplary embodiment.

For example, as illustrated in FIG. 5B, an image 51 is a background image with no moving object, and an image 52 is a more recent image in the monitored data. The monitoring apparatus compares the images 51 and 52 and detects a difference 53 between the two images.

In step 506, the monitoring apparatus detects whether garbage is present in the monitored area according to the difference between the two images.

During the implementation of step 506, the monitoring apparatus may detect whether the difference is garbage according to a preset garbage-feature library.

In step 508, if garbage is present in the monitored area, the monitoring apparatus detects whether the garbage is present on a floor of the monitored area. For example, the implementation of step 508 may be similar to step 406 in the method 400 (FIG. 4A).

In some embodiments, the monitoring apparatus detects whether the difference between the two images is on a floor of the monitored area; if yes, the monitoring apparatus detects whether the difference is garbage according to the garbage-feature library.

The detection of garbage based on a difference between two images is fast to compute and only requires a small computation load. Therefore, such way of detecting garbage is even applicable in monitoring apparatus with low computation capabilities.

In step 510, if the garbage is present on the floor of the monitored area, the monitoring apparatus acquires location information of the garbage in the monitored area. For example, the implementation of step 510 may be similar to step 408 in the method 400 (FIG. 4A).

In step 512, the monitoring apparatus sends the location information of the garbage to a garbage-cleaning robot. For example, the implementation of step 512 may be similar to step 410 in the method 400 (FIG. 4A).

In step 514, the garbage-cleaning robot receives the location information of the garbage sent by the monitoring apparatus. For example, the implementation of step 514 may be similar to step 412 in the method 400 (FIG. 4A).

In step 516, the garbage-cleaning robot cleans the garbage according to the location information. For example, the implementation of step 516 may be similar to step 414 in the method 400 (FIG. 4A).

Figure 6A:
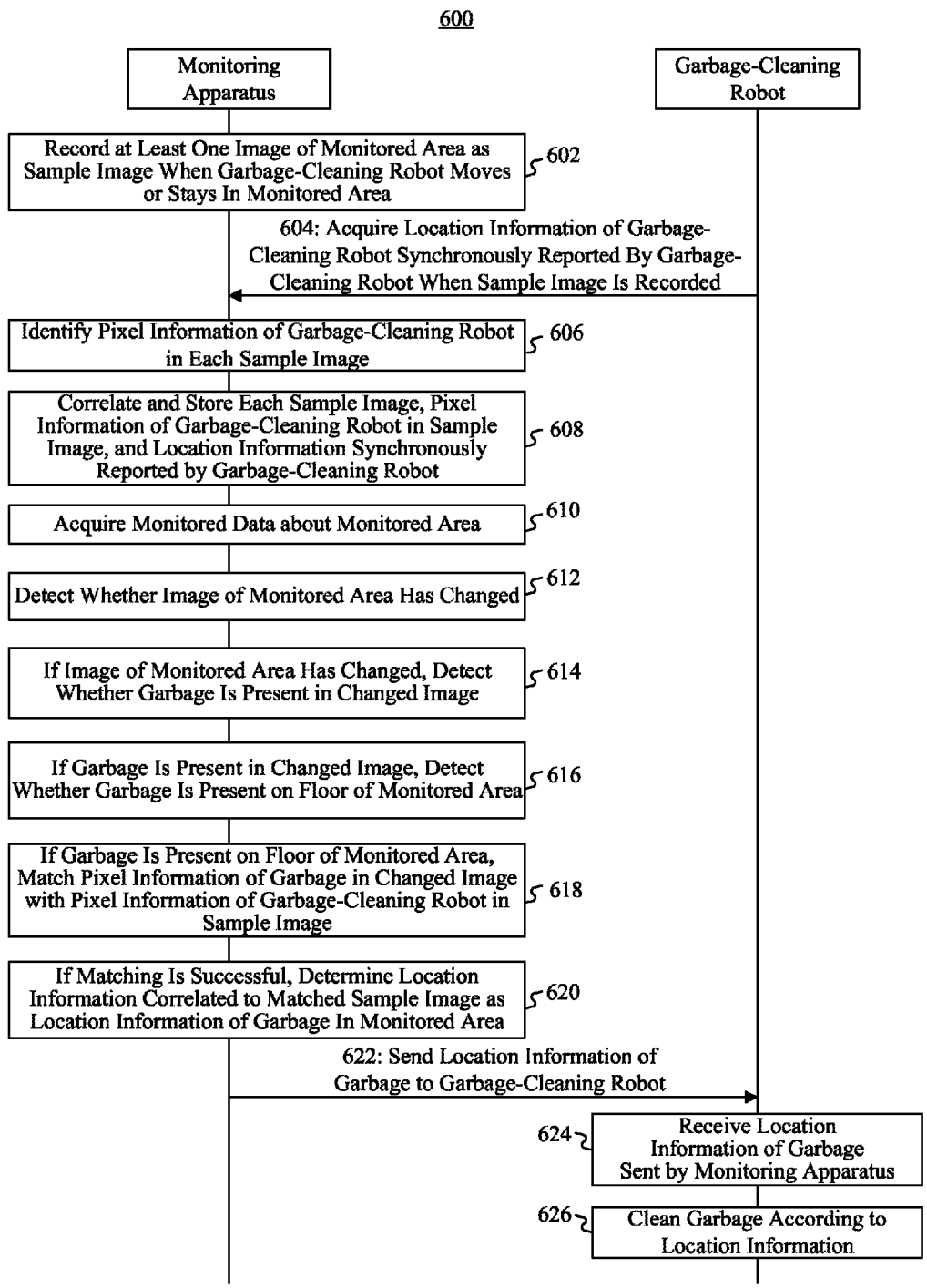
FIG. 6A is a flowchart of a method for cleaning garbage, according to an exemplary embodiment.

FIG. 6A is a flowchart of a method 600 for cleaning garbage, according to an exemplary embodiment. For example, the method 600 may be applied in the implementation environment 100 (FIG. 1). Referring to FIG. 6A, the method 600 may include the following steps.

In step 602, when a garbage-cleaning robot moves or stays in a monitored area, a monitoring apparatus records at least one image of the monitored area as a sample image.

For example, when starting cleaning the monitored area, the garbage-cleaning robot may send a starting signal to the monitoring apparatus. The monitoring apparatus may receive the starting signal and record at least one image of the monitored area as a sample image.

In step 604, when recording each sample image, the monitoring apparatus receives location information of the garbage-cleaning robot synchronously reported by the garbage-cleaning robot.

In exemplary embodiments, the location information may be the robot's location on the floor of the monitored area. For example, the garbage-cleaning robot may employ a multi-point matrix positioning technology to express the robot's location on the floor in matrix coordinates. A piece of exemplary location information may be expressed as "report time: xx year xx month xx day xx hour xx minute xx second, location information: matrix coordinates (x, y)."

In step 606, the monitoring apparatus identifies pixel information of the garbage-cleaning robot in each sample image.

For example, the monitoring apparatus may pre-store top-cover features of the garbage-cleaning robot, and identifies the pixel information of the garbage-cleaning robot in each sample image according to the top-cover features.

In step 608, the monitoring apparatus correlates and stores each sample image, the pixel information of the garbage-cleaning robot in each sample image, and the location information synchronously reported by the garbage-cleaning robot. For example, Table 1 illustrates a relationship of the stored information.

TABLE 1

Correlated Information Stored by Monitoring Apparatus

| Sample Image | Pixel Information in Sample Image | Location Information on Floor |
| --- | --- | --- |
| Sample Image 1 | Upper Left Pixel 1, Upper Right Pixel 1, Lower Left Pixel 1, Lower Right Pixel 1 | Matrix Coordinates (x1, y1) |
| Sample Image 2 | Upper Left Pixel 2, Upper Right Pixel 2, Lower Left Pixel 2, Lower Right Pixel 2 | Matrix Coordinates (x2, y2) |
| Sample Image 3 | Upper Left Pixel 3, Upper Right Pixel 3, Lower Left Pixel 3, Lower Right Pixel 3 | Matrix Coordinates (x3, y3) |
| Sample Image 4 | Upper Left Pixel 4, Upper Right Pixel 4, Lower Left Pixel 4, Lower Right Pixel 4 | Matrix Coordinates (x4, y4) |
| Sample Image 5 | Upper Left Pixel 5, Upper Right Pixel 5, Lower Left Pixel 5, Lower Right Pixel 5 | Matrix Coordinates (x5, y5) |

In step 610, the monitoring apparatus acquires monitored data in the monitored area. For example, the implementation of step 610 may be similar to step 402 in the method 400 (FIG. 4A).

In step 612, the monitoring apparatus detects whether an image of the monitored area has changed.

If the monitored data is video data, the monitoring apparatus may detect the change by comparing two adjacent frames, e.g., an nth frame and an (n+1)th frame. If the monitored data is image data, the monitoring apparatus may detect the change by comparing two adjacent images collected at a predetermined time interval, e.g., 5 seconds.

The monitoring apparatus may also detect the change by comparing the image of the monitored area with a background image of the monitored area with no moving object. The monitoring apparatus may acquire the background image when the garbage-cleaning robot finishes a cleaning of the monitored area and the user is not in the monitored area.

In step 614, if the image of the monitored area has changed, the monitoring apparatus detects whether garbage is present in the changed image.

For example, the monitoring apparatus may detect whether garbage is present in the changed image according to a preset garbage-feature library.

In step 616, if garbage is present in the monitored region, the monitoring apparatus detects whether the garbage is present on the floor of the monitored area. For example, the implementation of step 616 may be similar to step 406 in the method 400 (FIG. 4A).

In some embodiments, the monitoring apparatus detects whether an image of the floor of the monitored area has changed; and if the image of the floor has changed, the monitoring apparatus detects whether garbage is present in the changed image of the floor.

In step 618, if the garbage is present on the floor of the monitored area, the monitoring apparatus matches the pixel information of the garbage with the pixel information of the garbage-cleaning robot in a sample image.

Figure 6B:
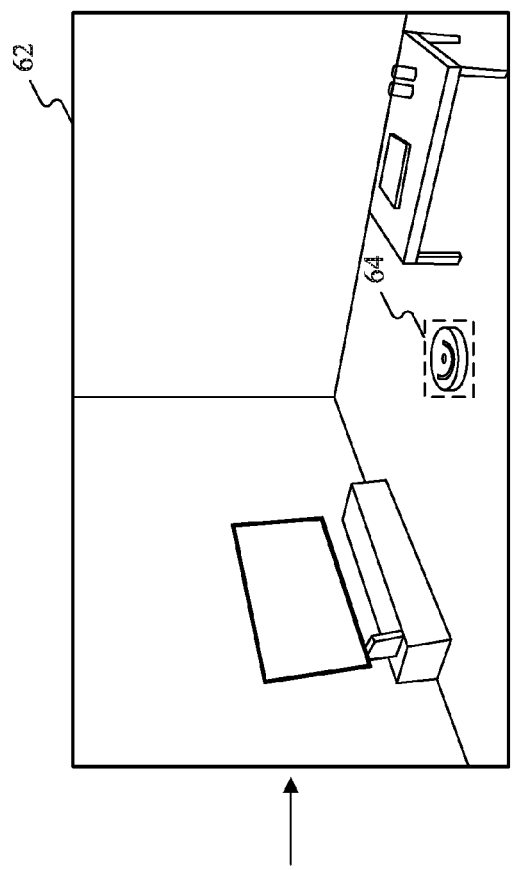
FIG. 6B is a schematic diagram illustrating an example of implementing a method for cleaning garbage, according to an exemplary embodiment.
Figure 6B:
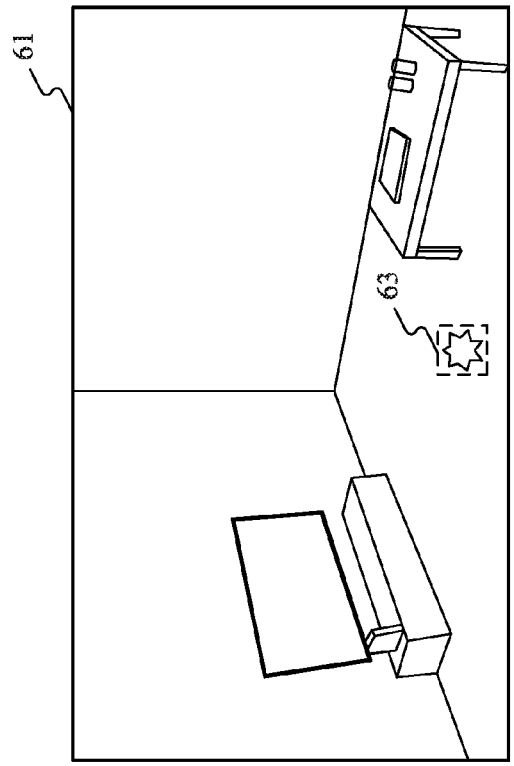

For example, as illustrated in FIG. 6B, the monitoring apparatus matches pixel information 63 of the garbage in a monitored image 61 with pixel information 64 of the garbage-cleaning robot in a sample image 62. A successful matching means that an overlapping degree of two pixel information exceeds a predetermined threshold.

In step 620, if the matching is successful, the monitoring apparatus determines the location information of the garbage-cleaning robot in the matched sample image as the location information of the garbage in the monitored area.

For example, in FIG. 6B, if the pixel information 63 matches the pixel information 64 and the sample image 62 is the sample image 1 listed in Table 1, then the monitoring apparatus determines the matrix coordinates (x1, y1) as the location information of the garbage in the monitored area.

Detecting the location information of the garbage based on sample images may reduce the monitoring apparatus' burden of computing the location information of the garbage, and therefore reduce the requirement for the monitoring apparatus' computation capabilities.

In step 622, the monitoring apparatus sends the location information of the garbage to the garbage-cleaning robot. For example, the implementation of step 622 may be similar to step 410 in the method 400 (FIG. 4A).

In step 624, the garbage-cleaning robot receives the location information of the garbage sent by the monitoring apparatus.

In step 626, the garbage-cleaning robot cleans the garbage according to the location information. The garbage-cleaning robot may move to the part of the floor corresponding to the location information, and then cleans the garbage.

Figure 7:
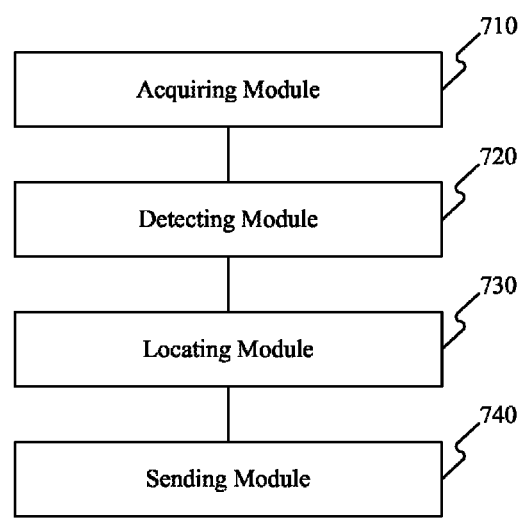
FIG. 7 is a block diagram of a device for cleaning garbage, according to an exemplary embodiment.

FIG. 7 is a block diagram of a device 700 for cleaning garbage, according to an exemplary embodiment. The device 700 may be implemented as all or part of a monitoring apparatus through software, hardware, or a combination of software and hardware. The device 700 may include an acquiring module 710, a detecting module 720, a locating module 730, and a sending module 740.

The acquiring module 710 is configured to acquire monitored data about a monitored area. The detecting module 720 is configured to detect whether garbage is present in the monitored area according to the monitored data. The locating module 730 is configured to acquire location information of the garbage if the garbage is present in the monitored area. The sending module 740 is configured to send the location information to a garbage-cleaning robot, so that the garbage-cleaning robot can clean the garbage according to the location information.

Figure 8:
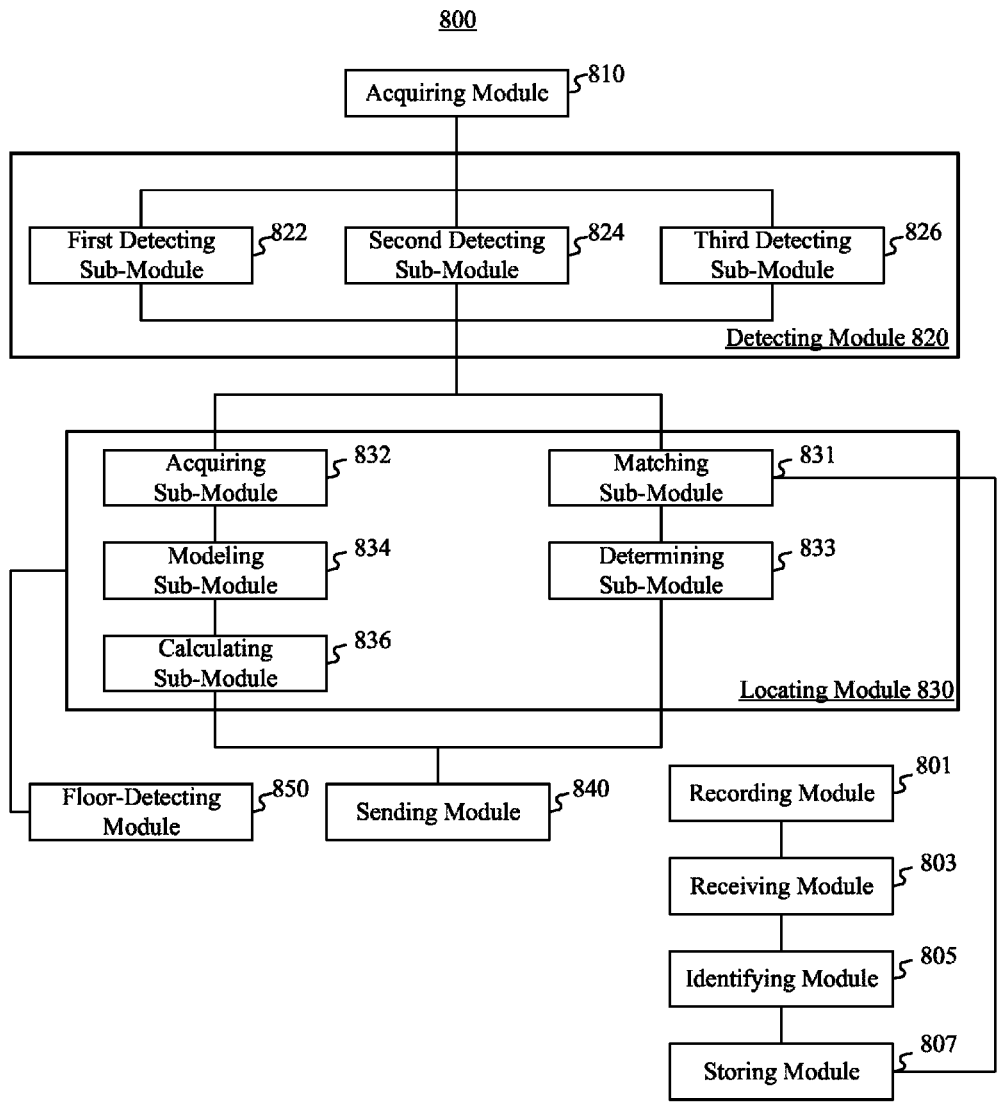
FIG. 8 is a block diagram of a device for cleaning garbage, according to an exemplary embodiment.

FIG. 8 is a block diagram of a device 800 for cleaning garbage, according to an exemplary embodiment. The device 800 may be implemented as all or part of a monitoring apparatus with software, hardware, or a combination of software and hardware. The device for 800 may include an acquiring module 810, a detecting module 820, a locating module 830, and a sending module 840, similar to the above-described acquiring module 710, detecting module 720, locating module 730, and sending module 740 (FIG. 7), respectively.

In some embodiments, referring to FIG. 8, the detecting module 820 may further include a first detecting sub-module 822, a second detecting sub-module 824, and a third detecting sub-module 826. The first detecting sub-module 822 is configured to detect whether a user action produces garbage according to at least one image in the monitored data. The second detecting sub-module 824 is configured to compare two images in the monitored data to acquire a difference between the two images, and to detect whether garbage is present in the monitored area according to the difference. The third detecting sub-module 826 is configured to detect whether an image of the monitored area has changed, and, if the image has changed, to detect whether garbage is present in the changed image.

In some embodiments, referring to FIG. 8, the locating module 830 may further include an acquiring sub-module 832, a modeling sub-module 834, and a computing sub-module 836. The acquiring sub-module 832 is configured to acquire one or more intersections between walls and a floor of the monitored area according to the monitored data. The modeling sub-module 834 is configured to model the floor according to the one or more sections between the walls and the intersection in the monitored area. The computing sub-module 836 is configured to compute location information of the garbage on the modeled floor.

In some embodiments, referring to FIG. 8, the device 800 may further include a recording module 801, a receiving module 803, an identifying module 805, and a storing module 807. The recording module 801 is configured to record at least one image of the monitored area as a sample image when the garbage-cleaning robot moves or stays in the monitored area. The receiving module 803 is configured to receive location information of the garbage-cleaning robot synchronously reported by the garbage-cleaning robot when each sample image is recorded. The identifying module 805 is configured to identify pixel information of the garbage-cleaning robot in each sample image. The storing module 807 is configured to correlate and store each sample image, the pixel information of the garbage-cleaning robot in each sample image, and the location information synchronously reported by the garbage-cleaning robot. In some embodiments, referring to FIG. 8, the locating module 830 may further include a matching sub-module 831 and a determining sub-module 833. The matching sub-module 831 is configured to match pixel information of garbage in a monitored image with pixel information of the garbage-cleaning robot in a sample image. The determining sub-module 833 is configured to, if the matching is successful, determine the location information of the garbage-cleaning robot in the matched sample image as the location information of the garbage.

In some embodiments, referring to FIG. 8, the device 800 may further include a floor-detecting module 850. The floor-detecting module is configured to detect whether the garbage is present on the floor of the monitored area.

Figure 9:
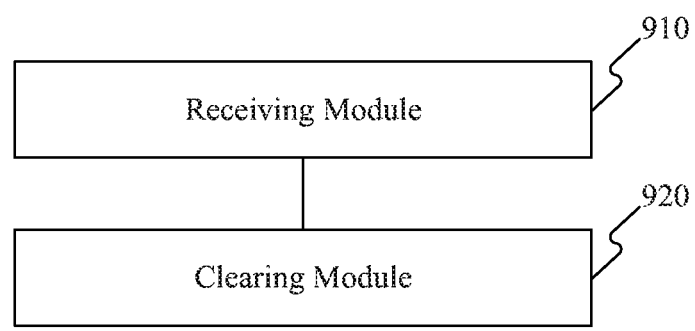
FIG. 9 is a block diagram of a device for cleaning garbage, according to an exemplary embodiment.

FIG. 9 is a block diagram of a device 900 for cleaning garbage, according to an exemplary embodiment. The device 900 may be implemented as all or part of a garbage-cleaning robot through software, hardware, or a combination of software and hardware. The device 900 may include a receiving module 910 and a cleaning module 920.

The receiving module 910 is configured to receive location information of the garbage sent by a monitoring apparatus. In exemplary embodiments, the monitoring apparatus acquires monitored data about a monitored area and detects whether garbage is present in the monitored area according to the monitored data. If the garbage is present in the monitored area, the monitoring apparatus acquires and sends the location information of the garbage to the garbage-cleaning robot. The cleaning module 920 is configured to clean the garbage according to the location information.

Figure 10:
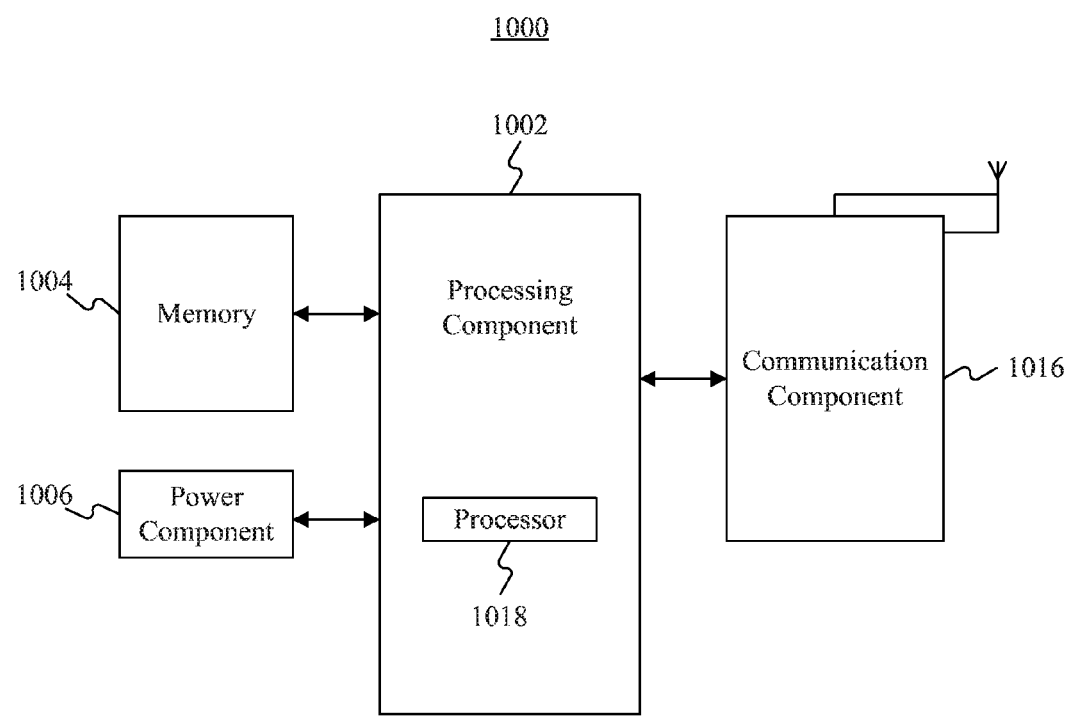
FIG. 10 is a block diagram of a device for cleaning garbage, according to an exemplary embodiment.

FIG. 10 is a block diagram illustrating a device 1000 for cleaning garbage, according to an exemplary embodiment. For example, the device 1000 may be a monitoring camera, a combination of a monitoring camera and a server, or a combination of a monitoring camera and a mobile terminal.

Referring to FIG. 10, the device 1000 may include one or more of a processing component 1002, a memory 1004, a power component 1006, and a communication component 1016.

The processing component 1002 generally controls overall operations of the device 1000, including such operations as address analysis, data reception and transmission, data traffic control, and the like. The processing component 1002 may include one or more processors 1018 to execute instructions to perform all or a part of the steps in the above-described methods. In addition, the processing component 1002 may include one or more modules which facilitate the interaction between the processing component 1002 and other components.

The memory 1004 is configured to store various types of data to support the operations of the device 1000. Examples of such data include instructions for performing any application or method on the device 1000, user data, and the like. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk, etc. The memory 1004 further includes one or more modules, wherein the one or more modules are configured to be run by one or more processors 1018, to implement all or a part of the steps in the above-described methods for cleaning garbage.

The power component 1006 provides power to various components of the device 1000. The power component 1006 may include a power management system, one or more power supplies, and other components associated with the generation, management, and distribution of power in the device 1000.

The communication component 1016 is configured to facilitate wired or wireless communications between the device 1000 and other devices. The device 1000 may establish a communication standard-based wireless network, for example, a WiFi network. In an exemplary embodiment, the communication component 1016 externally transmits a broadcast signal or broadcast associated information via a broadcast channel.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 1004, executable by the processor 1018 in the device 1000, for performing the above-described method for cleaning garbage. For example, the non-transitory computer-readable storage medium may be a ROM, a random access memory (RAM), a compact disc read-only memory (CD-ROM), a magnetic tape, a floppy disc, an optical data storage device, or the like.

Figure 11:
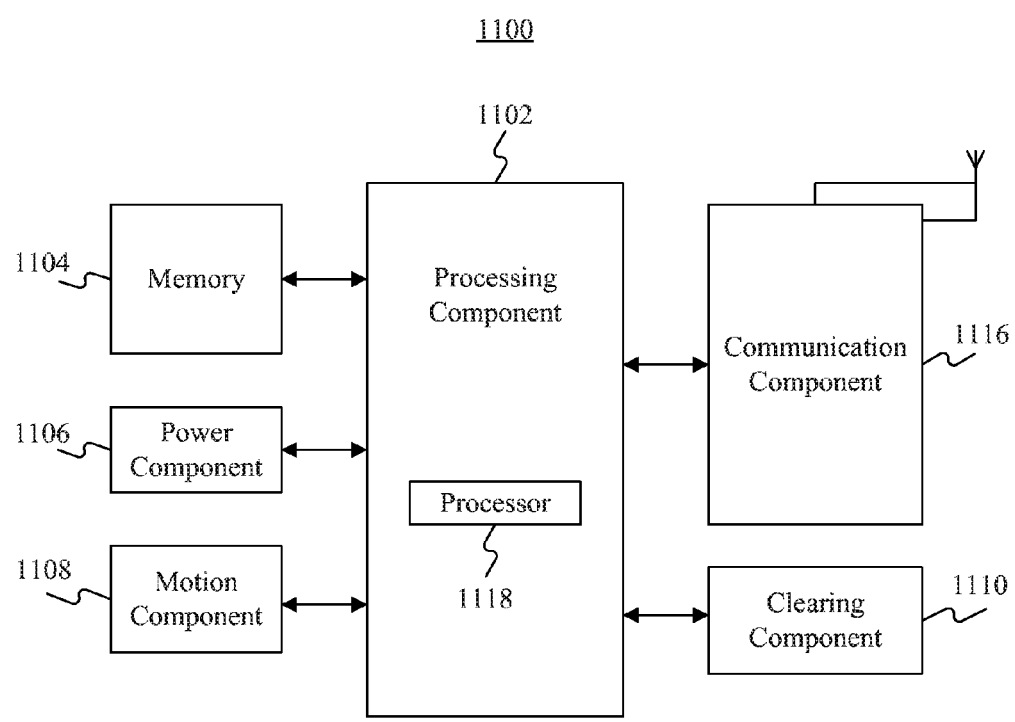
FIG. 11 is a block diagram of a device for cleaning garbage, according to an exemplary embodiment.

FIG. 11 is a block diagram illustrating a device 1100 for cleaning garbage, according to an exemplary embodiment. For example, the device 1100 may be a sweeping robot, a mopping robot, and the like.

Referring to FIG. 11, the device 1100 may include one or more of a processing component 1102, a memory 1104, a power component 1106, a motion component 1108, a cleaning component 1110, and a communication component 1116.

The processing component 1102 generally controls overall operations of the device 1100, including such operations as address analysis, data reception and transmission, data traffic control, and the like. The processing component 1102 may include one or more processors 1118 to execute instructions to perform all or a part of the steps in the above-described methods. In addition, the processing component 1102 may include one or more modules which facilitate the interaction between the processing component 1102 and other components.

The memory 1104 is configured to store various types of data to support the operations of the device 1100. Examples of such data include instructions for performing any application or method on the device 1100, user data, and the like. The memory 1104 may be implemented using any type of volatile or non-volatile memory devices, or a combination thereof, such as a SRAM, an EEPROM, an EPROM, a PROM, a ROM, a magnetic memory, a flash memory, a magnetic or optical disk. The memory 1104 further includes one or more modules, wherein the one or more modules are configured to be run by one or more processors 1118, to implement all or a part of the steps in the above-described method for cleaning garbage.

The power component 1106 provides power to various components of the device 1100. The power component 1106 may include a power management system, one or more power supplies, and other components associated with the generation, management, and distribution of power in the device 1100.

The motion component 1108 is a mechanical device for moving the device 1100. The motion component 1108 may be a wheel, a track, or a mechanical foot.

The cleaning component 1110 is a mechanical device for cleaning garbage. The cleaning component 1110 may be a vacuum sweeping component, a sweeping component, or a mopping component.

The communication component 1116 is configured to facilitate wired or wireless communications between the device 1100 and other devices. The device 1100 may establish a communication standard-based wireless network, for example, a WiFi network. In an exemplary embodiment, the communication component 1116 externally transmits a broadcast signal or broadcast associated information via a broadcast channel.

In exemplary embodiments, the device 1100 may be implemented with one or more ASICs, DSPs, DSPDs, PLDs, FPGAs, controllers, micro-controllers, microprocessors, or other electronic components, for performing the above-described methods.

In exemplary embodiments, there is also provided a non-transitory computer-readable storage medium including instructions, such as included in the memory 1104, executable by the processor 1118 in the device 1100, for performing the above-described method for cleaning garbage. For example, the non-transitory computer-readable storage medium may be a ROM, a RAM, a CD-ROM, a magnetic tape, a floppy disc, an optical data storage device, or the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the present disclosure will be apparent to those skilled in the art from consideration of the specification and practice the present disclosure. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes may be made without departing from the scope thereof. It is intended that the scope of the present disclosure is only defined by the appended claims.

What is claimed is:

1. A garbage-cleaning method performed by a monitoring apparatus, comprising:
   acquiring monitored data about a monitored area;
   detecting whether garbage is present in the monitored area according to the monitored data;
   if garbage is present in the monitored area, acquiring location information of the garbage in the monitored area, wherein the acquiring of the location information of the garbage in the monitored area includes:
      identifying an intersection between a wall and a floor of the monitored area according to the monitored data;
      modeling the floor according to the intersection between the wall and the floor; and
      computing location information of the garbage based on the modeled floor; and
   sending the location information of the garbage to a garbage-cleaning robot configured to clean the garbage according to the location information.

2. The method according to claim 1, wherein the detecting of whether the garbage is present in the monitored area comprises:
   detecting whether a user action produces garbage according to at least one image in the monitored data.

3. The method according to claim 1, wherein the detecting of whether the garbage is present in the monitored area comprises:
   comparing two images in the monitored data to acquire a difference between the two images; and
   detecting whether the garbage is present in the monitored area according to the difference between the two images.

4. The method according to claim 1, wherein the detecting of whether the garbage is present in the monitored area comprises:
   detecting whether an image of the monitored data has changed; and
   if the image of the monitored area has changed, identifying whether garbage is present in the image.

5. The method according to claim 1, further comprising:
   recording at least one image of the monitored area as a sample image when the garbage-cleaning robot moves or stays in the monitored area;
   receiving location information of the garbage-cleaning robot synchronously reported by the garbage-cleaning robot when each sample image is recorded;
   identifying pixel information of the garbage-cleaning robot in each sample image; and
   correlating and storing each sample image, the pixel information of the garbage-cleaning robot in each sample image, and the location information of the garbage-cleaning robot synchronously reported by the garbage-cleaning robot.

6. The method according to claim 5, wherein the monitored data includes a monitored image, the acquiring of the location information of the garbage in the monitored area comprising:
matching pixel information of the garbage in the monitored image with pixel information of the garbage-cleaning robot in a sample image; and
if the matching is successful, determining the location information correlated to the matched sample image as the location information of the garbage in the monitored area.

7. The method according to claim 1, wherein the detecting of whether the garbage is present in the monitored area according to the monitored data comprises:
detecting whether the garbage is present on a floor of the monitored area according to the monitored data.

8. The method according to claim 7, wherein the acquiring of the location information of the garbage in the monitored area comprises:
if the garbage is present on the floor of monitored area, acquiring the location information of the garbage on the floor of the monitored area.

9. A garbage-cleaning method for use in performed by a garbage-cleaning robot, comprising:
receiving location information of garbage sent by a monitoring apparatus; and
cleaning the garbage according to the location information,
wherein the monitoring apparatus:
acquires monitored data about a monitored area;
identifies an intersection between a wall and a floor of the monitored area according to the monitored data;
models the floor according to the intersection between the wall and the floor; and
computes location information of the garbage based on the modeled floor.

10. A monitoring apparatus for cleaning garbage, comprising:
a processor; and
a memory for storing instructions executable by the processor;
wherein the processor is configured to:
acquire monitored data about a monitored area;
detect whether garbage is present in the monitored area according to the monitored data;
if garbage is present in the monitored area, acquire location information of the garbage in the monitored area, wherein the acquiring of the location information of the garbage in the monitored area includes:
identifying an intersection between a wall and a floor of the monitored area according to the monitored data;
modeling the floor according to the intersection between the wall and the floor; and
computing location information of the garbage based on the modeled floor; and
send the location information of the garbage to a garbage-cleaning robot configured to clean the garbage according to the location information.

11. The monitoring apparatus according to claim 10, wherein the processor is further configured to:
detect whether a user action produces garbage according to at least one image in the monitored data.

12. The monitoring apparatus according to claim 10, wherein the processor is further configured to:
compare two images in the monitored data to acquire a difference between the two images; and
detect whether garbage is present in the monitored area according to the difference between the two images.

13. The monitoring apparatus according to claim 10, wherein the processor is further configured to:
detect whether an image of the monitored area has changed; and
if the image of the monitored area has changed, identify whether garbage is present in the image.

14. The monitoring apparatus according to claim 10, wherein the processor is further configured to:
record at least one image of the monitored area as a sample image when the garbage-cleaning robot moves or stays in the monitored area;
receive location information of the garbage-cleaning robot synchronously reported by the garbage-cleaning robot when each sample image is recorded;
identify pixel information of the garbage-cleaning robot in each sample image; and
correlate and store each sample image, the pixel information of the garbage-cleaning robot in each sample image, and the location information of the garbage-cleaning robot synchronously reported by the garbage-cleaning robot.

15. The monitoring apparatus according to claim 14, wherein the monitored data includes a monitored image and the processor is further configured to:
match pixel information of the garbage in the monitored image with pixel information of the garbage-cleaning robot in a sample image; and
if the matching is successful, determine the location information correlated to the matched sample image as the location information of the garbage in the monitored area.

16. The monitoring apparatus according to claim 10, wherein the processor is further configured to:
detect whether the garbage is present on a floor of the monitored area according to the monitored data.

17. The monitoring apparatus according to claim 16, wherein the processor is further configured to:
if the garbage is present on the floor of monitored area, acquire the location information of the garbage on the floor of the monitored area.

18. A garbage-cleaning robot, comprising:
a processor; and
a memory for storing instructions executable by the processor;
wherein the processor is configured to:
receive location information of garbage sent by a monitoring apparatus; and
clean the garbage according to the location information; and
wherein the monitoring apparatus:
acquires monitored data about a monitored area;
identifies an intersection between a wall and a floor of the monitored area according to the monitored data;
models the floor according to the intersection between the wall and the floor; and
computes location information of the garbage based on the modeled floor.

* * * * *